(12) United States Patent
Bezold et al.

(10) Patent No.: US 12,729,777 B2
(45) Date of Patent: Sep. 8, 2026

(54) SOLENOID VALVE

(71) Applicant: BUERKERT WERKE GMBH & CO. KG, Ingelfingen (DE)

(72) Inventors: Christian Bezold, Ingelfingen (DE); Dina Link, Ingelfingen (DE)

(73) Assignee: BUERKERT WERKE GMBH & CO. KG, Ingelfingen (DE)

( * ) Notice: Subject to any disclaimer, the term of this patent is extended or adjusted under 35 U.S.C. 154(b) by 0 days.

(21) Appl. No.: 19/193,817

(22) Filed: Apr. 29, 2025

(65) Prior Publication Data

US 2025/0334199 A1 Oct. 30, 2025

(30) Foreign Application Priority Data

Apr. 29, 2024 (DE) ..................... 10 2024 112 016.9

(51) Int. Cl.

| | |
|---|---|
| ***F16K 31/06*** | (2006.01) |
| ***F16K 27/02*** | (2006.01) |
| ***F16K 41/10*** | (2006.01) |

(52) U.S. Cl.

CPC ...... *F16K 31/0655* (2013.01); *F16K 27/0236* (2013.01); *F16K 27/029* (2013.01); *F16K 31/0641* (2013.01); *F16K 31/0672* (2013.01); *F16K 41/103* (2013.01); *F16K 2200/305* (2021.08)

(58) Field of Classification Search

CPC ............... F16K 31/0655; F16K 41/103; F16K 27/0236; F16K 27/029; F16K 31/0672; F16K 31/0641; F16K 7/14; F16K 7/16; F16K 7/12; F16K 2200/305

See application file for complete search history.

(56) References Cited

U.S. PATENT DOCUMENTS

| | | | | |
|---|---|---|---|---|
| 4,614,328 A * | 9/1986 | Zeadman | ............ | F16K 31/0672 251/129.17 |
| 2012/0025115 A1* | 2/2012 | Schiavone | .......... | F16K 31/0672 251/129.01 |
| 2018/0003306 A1* | 1/2018 | Bonanno | ............. | F16K 31/0672 |
| 2019/0170047 A1* | 6/2019 | Venekamp | ............. | F01N 11/00 |

FOREIGN PATENT DOCUMENTS

| | | | | |
|---|---|---|---|---|
| WO | WO-2017186449 A1 * | 11/2017 | ........... | F16K 39/024 |

* cited by examiner

*Primary Examiner* — Atif H Chaudry

(74) *Attorney, Agent, or Firm* — HAYES SOLOWAY P.C.

(57) ABSTRACT

A solenoid valve has a valve drive which includes an electromagnet, an actuator coupled to a diaphragm mounted for movement between an open position and a closed position by the valve drive, a fluid housing having a valve seat, wherein a fluid channel extends in the fluid housing from a first fluid connection to the valve seat and, proceeding from the valve seat, to a second fluid connection, and the diaphragm which cooperates with the valve seat. A support ring surrounds the actuator and rests against the diaphragm. An entrainment geometry is provided between the support ring and the actuator.

15 Claims, 6 Drawing Sheets

SOLENOID VALVE

TECHNICAL FIELD

The disclosure relates to a solenoid valve comprising a diaphragm which cooperates with a valve seat, wherein an actuator that is mounted for movement between an open position and a closed position is coupled to the diaphragm and the actuator, when in the closed position, presses the diaphragm onto the valve seat and, when in the open position, lifts the diaphragm off the valve seat.

In particular, the solenoid valve is a media-separated valve, that is, the valve drive is isolated from the medium that is controlled using the valve.

BACKGROUND OF THE INVENTION

For this purpose, the diaphragm provided in the valve is usually in the form of a separating diaphragm, that is, the diaphragm not only seals the valve seat, but also serves to seal the valve drive.

A drawback of valves of this type is that the media-contacted surface of the diaphragm may possibly be relatively large. Depending on the amount of fluid pressure prevailing at the valve inlet, a correspondingly high force is therefore transmitted via the media-contacted surface to the actuator, against which the actuator has to work. As a consequence, it is necessary to use a correspondingly strong electromagnet in the valve drive in order to switch the valve. Otherwise, leakage may occur at the valve seat. However, the larger the electromagnet, the larger the installation space required and the higher the energy consumption of the electromagnet.

US 2017/0017243 A1 describes a solenoid valve and a method of controlling the solenoid valve.

CN 112228588 B discloses an electromagnetic valve having a diaphragm for shutting off a valve channel.

It is therefore an object to provide a solenoid valve that has a compact design and at the same time ensures tight closing of the valve.

SUMMARY OF THE INVENTION

The disclosure provides by a solenoid valve, in particular a media-separated solenoid valve, having a valve drive which includes an electromagnet, an actuator mounted for movement between an open position and a closed position by means of the valve drive, a fluid housing having a valve seat, wherein a fluid channel extends in the fluid housing from a first fluid connection to the valve seat and, proceeding from the valve seat, to a second fluid connection, a diaphragm which cooperates with the valve seat, wherein the actuator is coupled to the diaphragm so that the actuator, when in the closed position, presses the diaphragm onto the valve seat and, when in the open position, lifts the diaphragm off the valve seat, and a support ring which is mounted for movement in the direction of movement of the actuator, surrounds the actuator and rests against the diaphragm. An entrainment geometry is provided between the support ring and the actuator and is designed such that when the actuator moves from the closed position to the open position, there is an idle travel between the actuator and the support ring such that when the actuator initially moves out of the closed position, no movement of the support ring is brought about and, after bridging the idle travel, the support ring is moved together with the actuator by the entrainment geometry toward the open position of the actuator.

In addition to the actuator, the support ring exerts a closing force on the diaphragm, as a result of which the solenoid valve can be kept reliably closed even at an increased fluid pressure. Specifically, the support ring provides a ring surface that additionally supports the diaphragm. This reduces the force that the actuator needs to apply to the diaphragm in the closed state of the solenoid valve.

Moreover, the support ring prevents the diaphragm from expanding, resulting in an extended service life as material fatigue occurs less quickly.

Since there is an idle travel between the actuator and the support ring, the support ring will only be lifted off the valve seat when the actuator has already approached the electromagnet to some extent, resulting in a greater magnetic force acting on the actuator. This allows the mechanical work of the electromagnet to be better exploited. In particular, less magnetic power is required, which means that a smaller magnetic coil can be used for the same valve nominal width compared to a valve without a support ring, which in turn is advantageous in terms of the required installation space. The power consumption of the electromagnet is also reduced as a result.

The additional support of the diaphragm allows the solenoid valve to be operated with a flow both above the seat and below the seat.

Owing to the idle travel, the support ring has, in particular, a reduced travel as compared to the actuator.

The actuator and the support ring are, for example, each acted upon with a spring force toward the valve seat by means of a spring. The springs provide the closing force required to close the solenoid valve against the fluid pressure and to keep it closed in the de-energized state of the solenoid valve.

When the solenoid valve is open, the diaphragm surface that is acted upon by pressure is relatively large, so that the fluid pressure produces a relatively high force on the diaphragm. By having two parallel-acting springs that act on the actuator and the support ring, the closing force is high enough to apply the diaphragm to the valve seat against the fluid pressure.

The two springs may be integrally connected to each other, in particular wherein the two springs extend in an M-shape as viewed in a sectional representation, with the V-shaped inner portion of the spring pressing against the actuator and the cylindrical outer portion pressing against the support ring. This means that, in spite of the integral connection to each other, the M-shaped configuration of the springs allows them to act on surfaces that are radially spaced apart. The integral configuration of the two springs considerably simplifies the handling of the springs during assembly.

According to one embodiment, the actuator has an intermediate portion which conically tapers toward the valve seat and in which the spring engaging the actuator is seated. This contributes to a compact design of the valve, in particular with regard to the installation space requirement in the radial direction.

For example, an armature sleeve is provided which also extends laterally of the actuator. The armature sleeve may have at its end close to the valve seat a radial flange against which the spring acting on the actuator and the spring acting on the support ring are supported, thereby providing a continuous support surface for the springs in a simple manner.

The solenoid valve may comprise a valve housing which can be fastened to the fluid housing, wherein the valve housing has a receiving space in which the support ring is arranged.

To ensure that the support ring does not press on the diaphragm with excessive force, the valve housing preferably has a stop provided therein which limits a movement of the support ring toward the valve seat. This has a positive effect on the service life of the diaphragm.

The support ring is, for example, axially guided in the valve housing. The axial guiding causes the support ring to be positioned radially at the same time, so that the diaphragm is automatically supported in the correct position by the support ring.

The receiving space may have a projection provided therein which protrudes radially inward from the valve housing and which rests against the diaphragm. The projection may serve to support the diaphragm and at the same time form the stop for the support ring. This also contributes to a compact design.

According to one embodiment, the entrainment geometry is formed by a collar which projects radially inward on the support ring and which is arranged so as to overlap in the radial direction with a collar that projects radially outward from the actuator. In the closed state of the solenoid valve, there is, in particular, an axial distance between the two collars to provide the idle travel.

Specifically, the entrainment geometry may be formed by a collar projecting radially inward on the support ring or by a collar projecting outward on the actuator and which projects into a groove on the actuator or on the support ring, respectively, and is seated in the groove with an axial clearance, the clearance defining the idle travel.

In both cases, the entrainment geometry is realized in a mechanically simple manner.

The media-contacted surface of the diaphragm is preferably made to be flat. As a result, the diaphragm has a small overall height and is easy to clean. In addition, the fluid-filled volume in the fluid housing is reduced.

In order to couple the diaphragm to the actuator, a coupling geometry may be provided on the diaphragm and the actuator may have a retainer formed therein, in which the coupling geometry is received with a form fit.

As an alternative, a coupling geometry may be formed on the actuator, wherein the diaphragm has a retainer provided thereon, in which the coupling geometry is received with a form fit.

The two aforementioned alternatives allow a simple coupling of the diaphragm to the actuator and also a simple replacement if the diaphragm needs to be replaced due to wear.

The alternative in which the retainer is formed in the actuator furthermore allows a particularly compact design in the radial direction.

BRIEF DESCRIPTION OF THE DRAWINGS

Further advantages and features of the disclosure will be apparent from the description below and from the accompanying drawings, to which reference is made and in which.

DETAILED DESCRIPTION OF THE INVENTION

Figure 1:
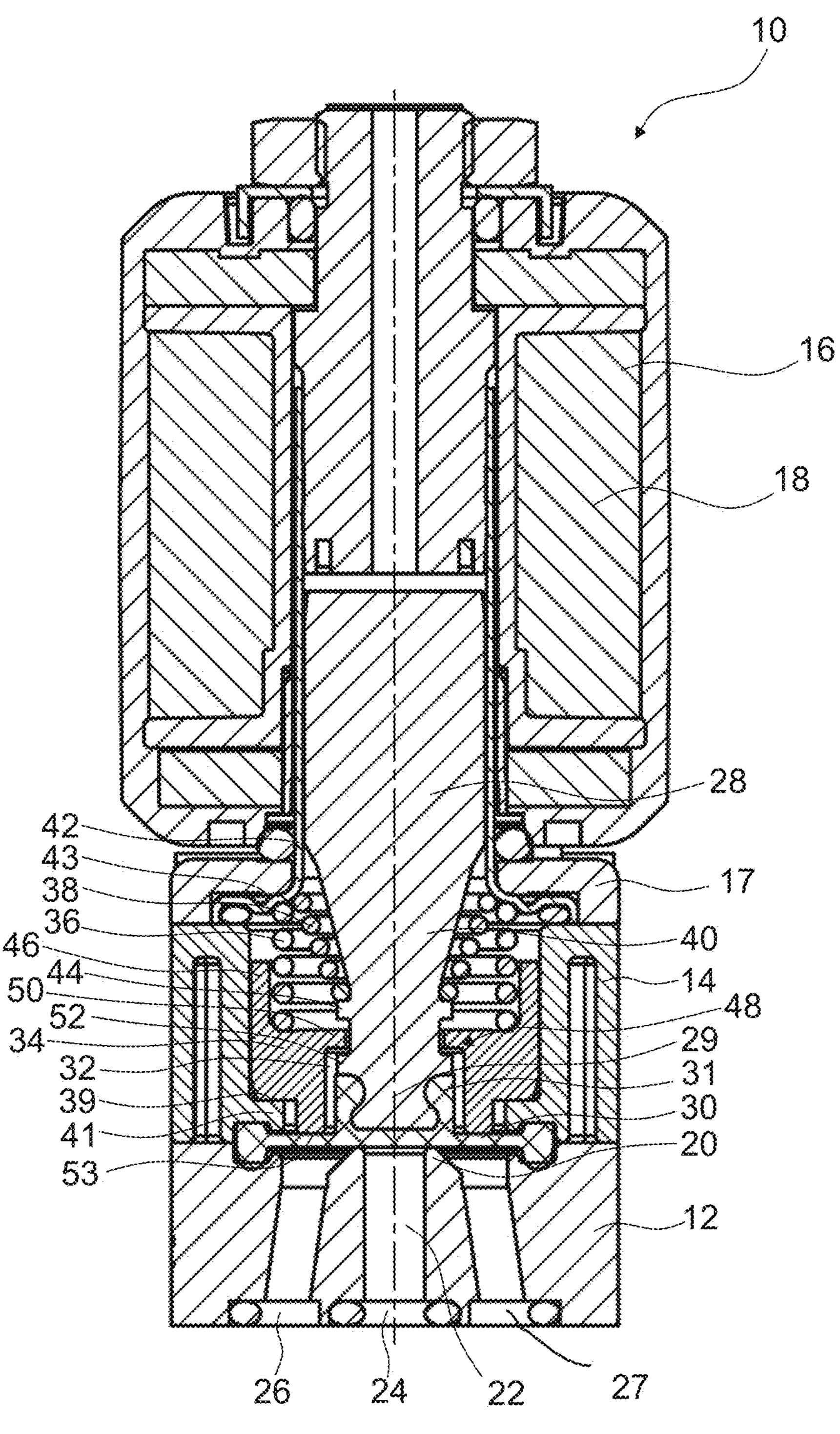
FIG. 1 shows a sectional view of a solenoid valve according to the disclosure.

FIG. 1 shows a solenoid valve 10 in a sectional representation. The solenoid valve 10 is a diaphragm valve, in particular a plunger valve.

The solenoid valve 10 is used in hydrogen applications, for example, but it is not limited thereto.

The solenoid valve 10 comprises a fluid housing 12, a valve housing 14 and a valve drive 16, which comprises an electromagnet 18.

The fluid housing 12 is attached to the valve housing 14, on which in turn the valve drive 16 is mounted.

In addition, a flange 17 is provided, which closes off the valve housing 14 on the top.

A valve seat 20 is formed in the fluid housing 12. A fluid channel 22 extends within the fluid housing 12 starting from a first fluid connection 24 to the valve seat 20 and starting from the valve seat 20 to a second fluid connection 26. Alternatively, a third fluid connection 27 may also start from or lead to the valve seat 20.

The solenoid valve 10 further comprises a movably mounted, plunger-like actuator 28, which can be moved between an open position and a closed position by means of the valve drive 16.

A diaphragm 30 cooperates with the valve seat 20; in the exemplary embodiment, the media-contacted surface of the diaphragm has a flat design.

The diaphragm 30 is made, for example, from an elastomer material, in particular from perfluoro rubber (FFKM) or ethylene propylene diene monomer rubber (EPDM).

The diaphragm 30 is held clamped between the fluid housing 12 and the valve housing 14. As a result, the diaphragm 30 also functions to seal the valve drive 16 from the fluid housing 12.

Optionally, the diaphragm 30 may have a bead on the edge which penetrates into grooves in the fluid housing 12 and in the valve housing 14 and is also clamped therein.

The actuator 28 is coupled to the diaphragm 30 in, e.g., a form-fitting manner, so that the actuator 28 presses the diaphragm 30 onto the valve seat 20 in the closed position and lifts the diaphragm 30 off the valve seat 20 in the open position.

In the exemplary embodiment, the coupling of the diaphragm 30 to the actuator 28 is realized in that a coupling geometry 29, which is, e.g., mushroom-shaped, is located on the actuator 28 and a complementary retainer 31, in which the coupling geometry 29 is received in a form-fitting manner, is located on the diaphragm 30.

Provided in the valve housing 14 is a receiving space 32 in which a sleeve-shaped support ring 34 as well as a first spring 36 and a second spring 38 are accommodated.

The support ring 34 is mounted so as to move in the direction of movement of the actuator 28, the support ring 34 being guided axially on its outer circumference in the valve housing 14.

To limit the movement of the support ring 34 toward the valve seat 20, the valve housing 14 has a stop 39 provided therein, which is formed by a step in the valve housing 14.

The step forms a projection 41 which protrudes radially inward from the valve housing 14 and rests against and supports the diaphragm 30.

The support ring 34 and the actuator 28 are each urged by force toward the valve seat by means of one of the two springs 36, 38, so that the support ring 34 and the actuator 28 are moved to, or held in, a closed position when the solenoid valve 10 is in the de-energized state.

Here, the springs 36, 38 are arranged to be concentric with each other and to overlap in the axial direction.

In order to allow a compact design, the actuator 28 has an intermediate portion 40 which is conically tapered toward the valve seat 20 and in which the spring 38 engaging the actuator 28 is seated.

Both springs 36, 38 are supported against an armature sleeve 42, which also extends laterally of the actuator 28 and which, at its end close to the valve seat 20, has a radial flange 43 produced by reshaping. Specifically, the springs 36, 38 are supported against the radial flange.

The radial flange 43 of the armature sleeve 42 is in turn supported against the flange 17.

Furthermore, the actuator 28 has a projection 44 provided thereon, against which the opposite end of the spring 38 is supported.

The spring 36 associated with the support ring 34 rests against a face side of the support ring 34.

To ensure a precise positioning of the spring 36, the support ring 34 has a collar 46 provided thereon, which protrudes axially from the end face toward the valve drive 16 and constitutes a lateral guide for the spring 36.

It is apparent from the sectional representation that the springs 36, 38 extend in an M-shape when viewed together. Specifically, the spring 36, which acts on the support ring 34, is cylindrical, while the spring 38, which acts on the actuator 28, is V-shaped.

The actuator 28 protrudes from the valve drive 16 into the receiving space 32 and, as mentioned, is coupled to the diaphragm 30 in the receiving space 32.

In addition, the actuator 28 is coupled to the support ring 34.

More specifically, an entrainment geometry 48 is provided between the support ring 34 and the actuator 28. The entrainment geometry 48 is configured such that when the actuator 28 moves from the closed position to the open position, there is an idle travel between the actuator 28 and the support ring 34. Therefore, an initial movement of the actuator 28 out of the closed position does not bring about any movement of the support ring 34 and, after bridging the idle travel, the support ring 34 is moved together with the actuator 28 toward the open position of the actuator 28 by the entrainment geometry 48.

The idle travel is, for example, between 0.2 and 0.5 mm, in particular 0.4 mm.

In the exemplary embodiment, the entrainment geometry 48 is formed by a collar 50 which projects radially inward on the support ring 34 and which is arranged to overlap in the radial direction with a collar 52 which projects radially outward from the actuator 28, so that the support ring 34 and the actuator 28 are coupled in the axial direction.

In an alternative embodiment, which is not shown for the sake of simplicity, instead of the collar 50, a transverse pin that entrains the support ring 34 is inserted in the actuator 28.

In the closed state of the solenoid valve 10, there is, more particularly, an axial distance between the two collars 50, 52, which corresponds to the idle travel.

A groove into which the collar 50 protrudes is formed between the projection 44 and the collar 52 on the actuator 28, with an axial play of the collar 50 existing in the groove to provide the idle travel. Of course, the other way round, the groove may also be provided in the support ring 34 and the collar protruding into the groove may be provided in the actuator 28. Assembly may be achieved either by an elasticity, e.g. of a support ring 34 made from a plastic material or by attachment of a ring forming the collar 52 or the projection 44, or by a type of bayonet or the like.

As a result, the support ring 34 is moved in the same axis as the actuator 28, which makes the structure of the solenoid valve 10 particularly simple in terms of complexity and the number of components. All forces and movements act in one axis; no mechanical deflections, axes of rotation or other complex couplings are required. In particular, all movements are performed in the effective direction of the electromagnet 18, which corresponds to the direction of movement of the actuator 28.

The support ring 34 rests against the diaphragm 30 when the solenoid valve 10 is in the closed state. Specifically, the support ring 34 is in contact with the diaphragm 30 along an annular contact surface 53.

The annular contact surface 53 is radially spaced apart from the actuator 28 over the circumference. Specifically, the annular contact surface 53 is located between the central area of the diaphragm 30, to which the actuator is coupled, and the rigidly clamped area of the diaphragm 30.

Figure 2:
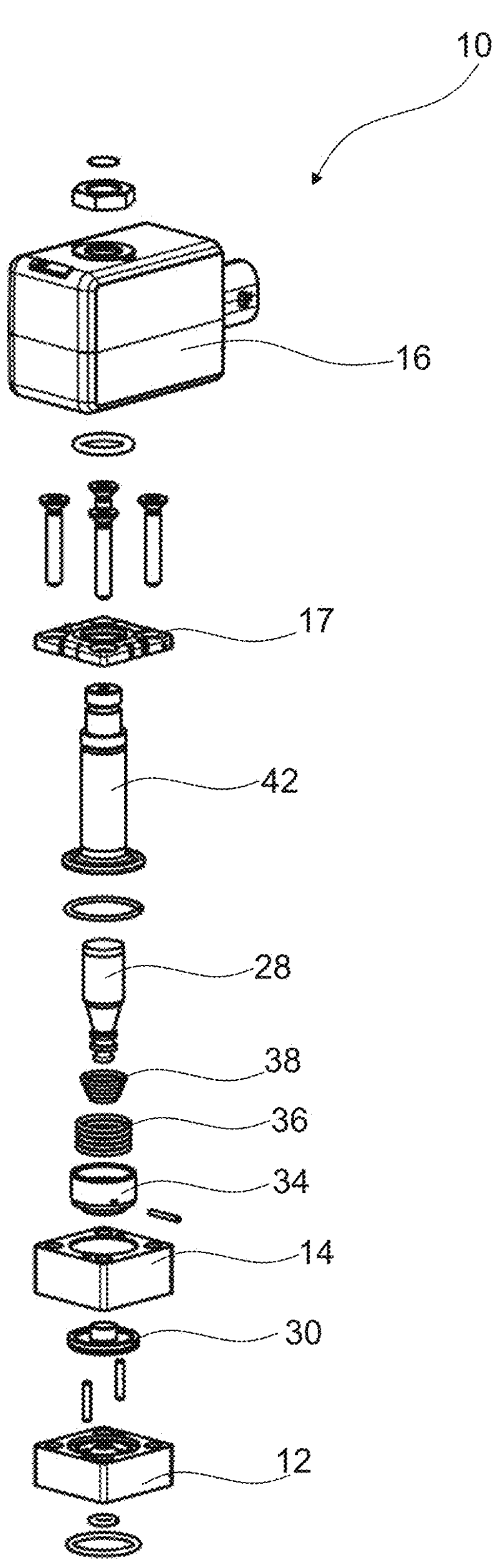
FIG. 2 shows an exploded view of the solenoid valve from FIG. 1.

FIG. 2 supplementarily shows the solenoid valve 10 in an exploded view.

Figure 3:
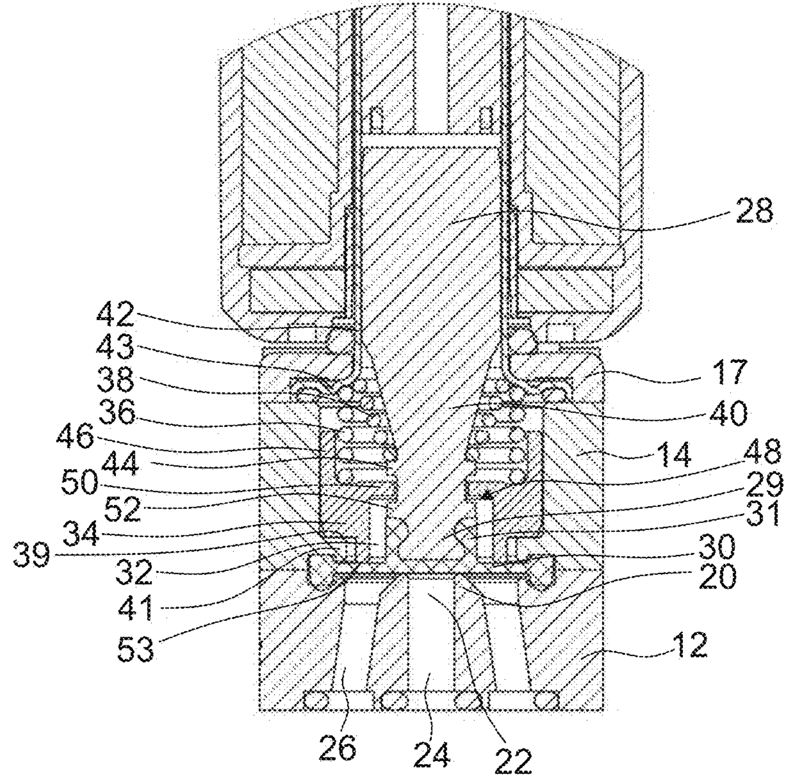
FIG. 3 shows a sectional representation of the solenoid valve from FIG. 1 in the area of the valve seat in the closed state of the solenoid valve.
Figure 4:
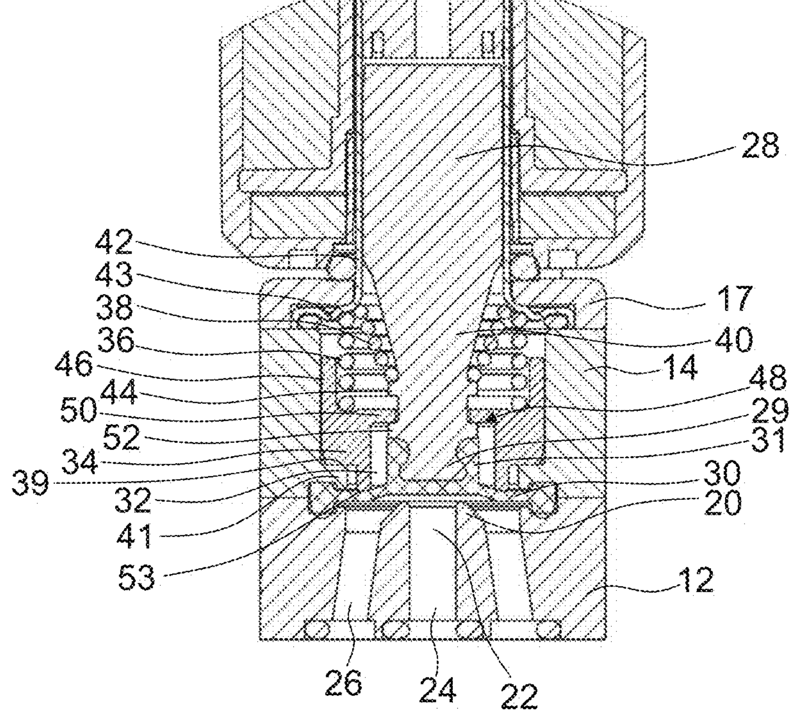
FIG. 4 shows a sectional representation of the solenoid valve from FIG. 1 in the area of the valve seat in a half-open state of the solenoid valve.
Figure 5:
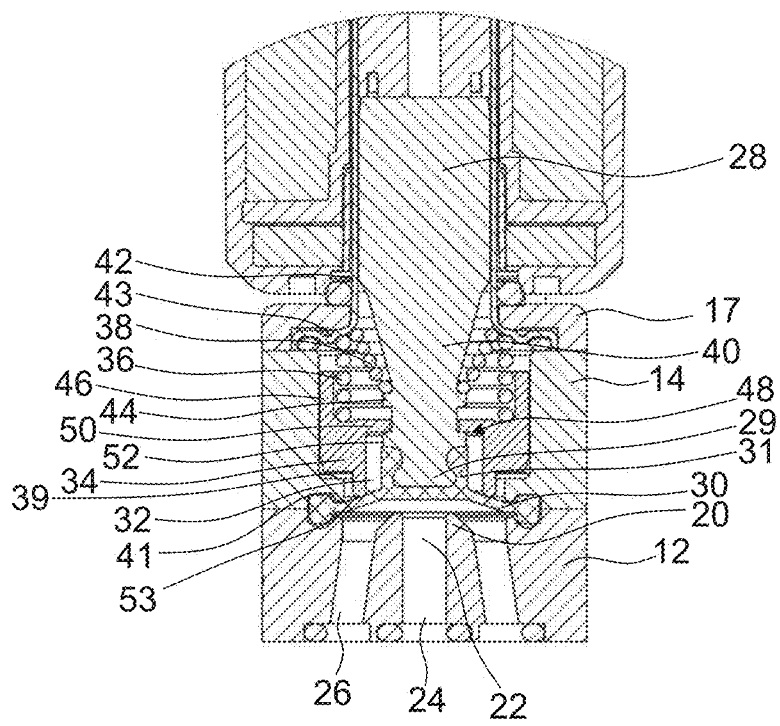
FIG. 5 shows a sectional representation of the solenoid valve from FIG. 1 in the area of the valve seat in a fully open state of the solenoid valve.

With reference to FIGS. 3 to 5, an opening process of the solenoid valve 10 will be described below.

FIG. 3 shows the solenoid valve 10 in a closed state. In particular, the solenoid valve 10 is closed in a de-energized state.

In this state, the actuator 28 for one thing presses the diaphragm 30 against the valve seat 20, and for another, the support ring 34 rests against the diaphragm 30 and additionally supports it. The support ring 34 assists the actuator 28, as it were, in keeping the solenoid valve 10 closed against the fluid pressure existing at the fluid inlet. Specifically, the support ring 34 reduces the force emanating from the fluid and acting on the actuator 28 by increasing the diaphragm surface acted upon by force from above and the overall closing force.

The fluid inlet may be formed either by the fluid connection 24 or by the fluid connection 26/27, that is, the flow against the solenoid valve 10 may be from above the seat or from below the seat.

In both cases, the solenoid valve 10 is kept closed by the actuator 28 and by the support ring 34 or by the spring forces acting on the actuator 28 and the support ring 34 in combination.

A higher fluid pressure can be switched in a solenoid valve 10 with a flow from below the seat than in a solenoid valve 10 with a flow from above the seat. For example, the solenoid valve 10 illustrated in FIGS. 1 to 5 can be used to switch a fluid pressure of 2 bar with a flow from above the seat, while a fluid pressure of 5 bar can be switched with a flow from below the seat. However, these values are merely exemplary and depend, among other things, on the nominal diameter of the valve seat 20. For example, the nominal diameter of the solenoid valve illustrated in FIGS. 1 to 5 is between 3 mm and 5 mm.

In both cases, the additional support effect of the support ring 34 allows a higher fluid pressure to be switched than would be the case without the support ring 34. In particular, the support ring 34 increases the possible fluid pressure at the fluid inlet by 50%. In this context, this is also referred to as a so-called back pressure tightness.

At the same time, by supporting the relatively thin diaphragm 30 designed with a large surface area, the support ring 34 improves the pressure stability of the diaphragm 30 by preventing uncontrolled expansion of the diaphragm 30. In this way, the service life of the diaphragm 30 can also be extended.

In an opening process of the solenoid valve 10, the actuator 28 is first moved out of its closed position by energizing the electromagnet 18, as illustrated in FIG. 4.

Due to the idle travel existing between the actuator 28 and the support ring 34, the support ring 34 first remains in its initial position and continues to rest against the diaphragm 30.

The valve drive 16, in particular the electromagnet 18, therefore initially only has to apply the force to move the actuator 28.

In the position illustrated in FIG. 4, the actuator 28 has been lifted by an amount that corresponds exactly to the idle travel.

In the process, the air gap between the actuator 28 and the electromagnet 18 has been reduced, as a result of which in this position a higher force acts on the actuator than is the case in the closed position of the actuator 28.

Due to the increased force on the actuator 28, it is possible to also move the support ring 34 out of its initial position after bridging the idle travel, so that the solenoid valve 10 is fully opened, as illustrated in FIG. 5.

This two-stage opening process allows the magnetic power of the electromagnet 18 to be better utilized, whereby a saving of energy can be achieved. In other words, it is possible to use a less powerful electromagnet 18 than would be the case if the support ring 34 had to be moved without an idle travel at the same time as the actuator 28, which is advantageous with a view to the manufacturing costs of the solenoid valve 10.

In fact, the electromagnet 18 would not be able to provide a sufficiently large magnetic force to move the support ring 34 together with the actuator 28 out of the closed position from the outset; this would require a more powerful electromagnet 18.

However, in the present case the effect is exploited that the magnetic force acting on the actuator 28 increases as the proximity to the electromagnet 18 increases.

To close the solenoid valve 10, the actuator 28 and the support ring 34 are moved back to the closed position by the spring force of the two springs 36, 38.

When the solenoid valve 10 is closed, the support ring 34 thus brings about an additional closing force on the diaphragm 30 and therefore allows the solenoid valve 10 to close against a higher fluid pressure than would be the case without the support ring 34.

Figure 6:
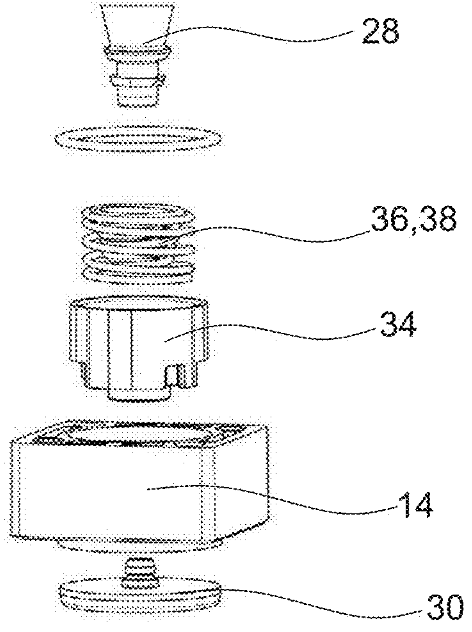
FIG. 6 shows a subassembly of an alternative embodiment according to the disclosure.

FIG. 6 illustrates an alternative embodiment of a solenoid valve 10.

The essential difference of the embodiment illustrated in FIG. 6 compared to the embodiment illustrated in FIGS. 1 to 5 consists in that the two springs 36, 38 are integrally connected to each other. In particular, the springs 36, 38 are part of a one-piece double spring. The shape of the double spring, however, basically corresponds to the shape of the two individual springs shown in FIG. 1.

Using a one-piece double spring simplifies the assembly of the solenoid valve 10, since assembly of the individual springs 36, 38 is challenging, in particular for small nominal widths of the solenoid valve 10.

Figure 7:
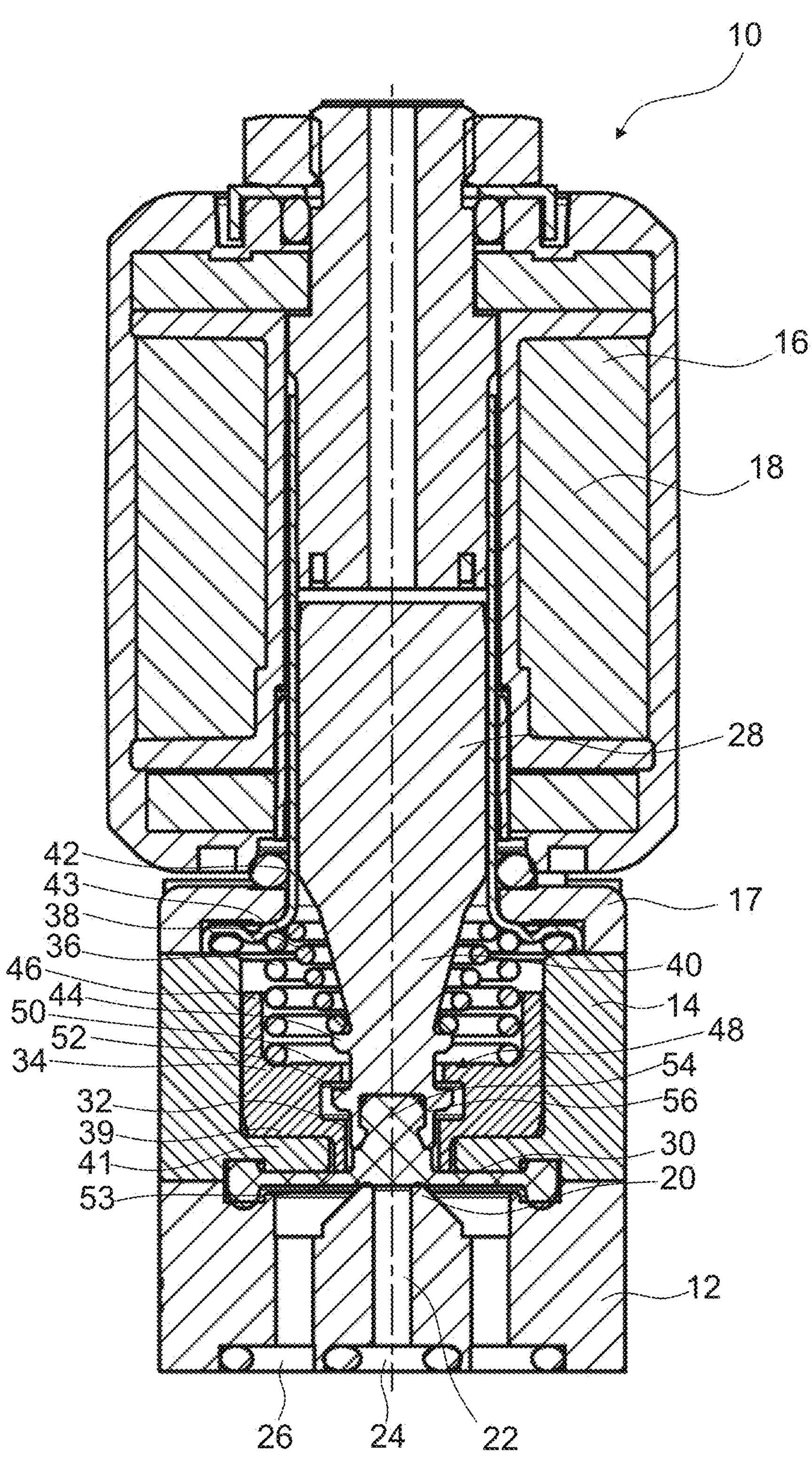
FIG. 7 shows a sectional view of a solenoid valve according to a further embodiment of the disclosure.
Figure 8:
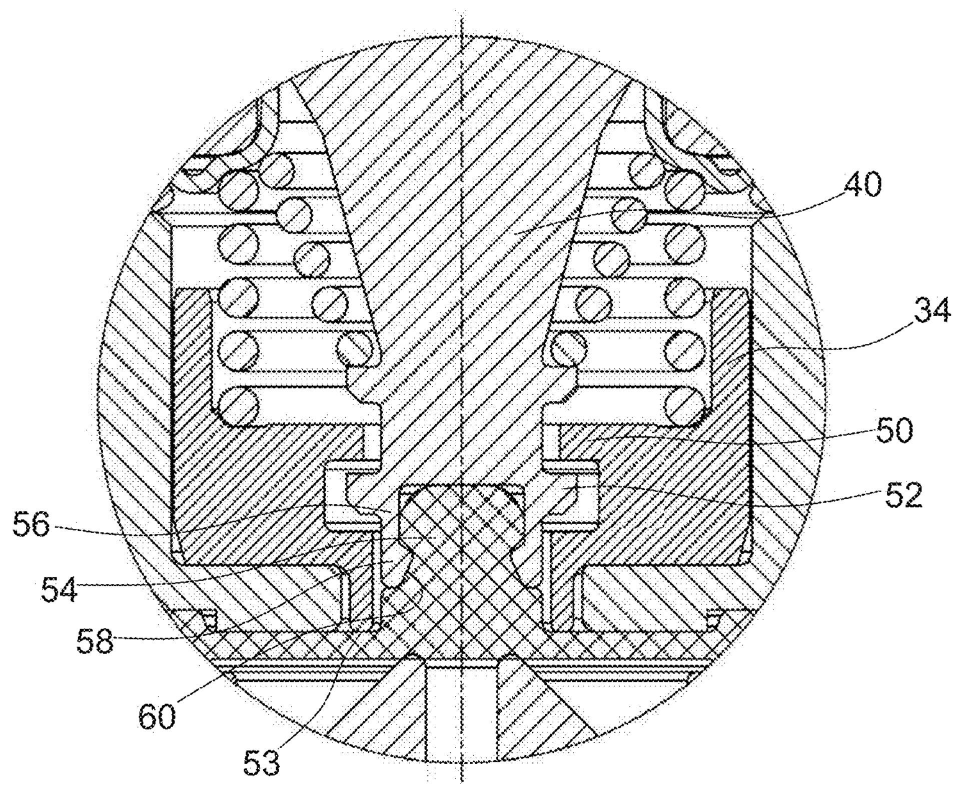
FIG. 8 shows a sectional representation of the solenoid valve from FIG. 6 in the area of the valve seat in the closed state of the solenoid valve.

FIGS. 7 and 8 illustrate a further embodiment of the solenoid valve 10.

One difference between the embodiment illustrated in FIGS. 7 and 8 and the embodiment of the solenoid valve 10 illustrated in FIGS. 1 to 5 resides in the way in which the actuator 28 is coupled to the diaphragm 30, as can be seen especially well in the detail view in FIG. 7.

In the embodiment shown in FIGS. 6 and 7, a coupling geometry 54 is provided on the diaphragm 30 and the actuator 28 has a retainer 56 formed therein, in which the coupling geometry 54 is received with a form fit. For this purpose, the retainer 56 has projections 58 protruding radially inwards and engaging in a recess 60 on the coupling geometry 54.

In particular, the coupling geometry 54 on the diaphragm 30 has the shape of a mushroom.

The fastening mechanism between the actuator 28 and the diaphragm 30 is reversed, as it were, compared to the embodiment according to FIGS. 1 to 5.

The embodiment shown in FIGS. 6 and 7 is, however, advantageous with regard to the radial chain dimension. In other words, the actuator 28 and the coupling geometry 54 can be made narrower in the radial direction than when arranged in reverse. This also allows the portion of the support ring 34 that rests against the diaphragm 30 to be brought closer to the actuator 28. In this way, the fluid pressure against which the solenoid valve 10 can be switched can be increased even further. For example, the solenoid valve 10 can be switched against a fluid pressure of up to 10 bar. Apart from this, this design is suitable for valves of small nominal width, for example a nominal width between 1 mm and 3 mm.

A further difference from the embodiment of the solenoid valve 10 shown in FIGS. 1 to 5 consists in that the projection 41 protruding radially inwards is extended. This is also due to the fact that the portion of the support ring 34 that rests against the diaphragm 30 is arranged closer to the actuator 28. The extension of the projection 41 restricts the mobility of the diaphragm 30; in particular, expansion of the diaphragm 30 is avoided even better.

Furthermore, the projection 41 causes the support ring 34 to be angled inwards at its end close to the valve seat 20, so that a radially thinner-walled sleeve extension extends radially on the inside of the projection 41 to the diaphragm 30 and presses against it.

It is advantageous if the support ring 34 is located in the area of the mouth of the fluid connection 26 and, if provided, 27, in order to support the diaphragm 30 in this area.

The invention claimed is:

1. A solenoid valve comprising a valve drive which comprises an electromagnet;

an actuator mounted for movement between an open position and a closed position by the valve drive;

a fluid housing having a valve seat, wherein a fluid channel extends in the fluid housing from a first fluid connection to the valve seat and, proceeding from the valve seat, to a second fluid connection;

a diaphragm which is configured to cooperate with the valve seat, wherein the actuator is coupled to the diaphragm so that the actuator, when in the closed position, presses the diaphragm onto the valve seat and, when in the open position, lifts the diaphragm off the valve seat;

a support ring which is mounted for movement in the direction of movement of the actuator, surrounds the actuator and rests against the diaphragm, wherein an entrainment geometry is provided between the support ring and the actuator and is designed such that when the actuator moves from the closed position to the open position, there is an idle travel between the actuator and the support ring such that when the actuator initially moves out of the closed position, no movement of the support ring is brought about and, after bridging the idle travel, the support ring is moved together with the actuator by the entrainment geometry toward the open position of the actuator.

2. The solenoid valve according to claim 1, wherein the actuator is acted upon with a spring force toward the valve seat by means of a first spring and support ring is acted upon with a spring force toward the valve seat by means of a second spring.

3. The solenoid valve according to claim 2, wherein the two springs are integrally connected to each other.

4. The solenoid valve according to claim 3, wherein the two springs together extend in an M-shape as viewed in a sectional representation, wherein the V-shaped inner portion of the spring is configured to press against the actuator and the cylindrical outer portion are configured to press against the support ring.

5. The solenoid valve according to claim 2, wherein the actuator has an intermediate portion which conically tapers toward the valve seat and in which the spring engaging the actuator is seated.

6. The solenoid valve according to claim 2, wherein an armature sleeve is provided which also extends laterally of the actuator, wherein the armature sleeve has at its end close to the valve seat a radial flange against which the first spring and the second spring are supported.

7. The solenoid valve according to claim 1, wherein the solenoid valve comprises a valve housing configured to be fastened to the fluid housing, wherein the valve housing has a receiving space in which the support ring is arranged, and wherein the valve housing has a stop provided therein which limits a movement of the support ring toward the valve seat.

8. The solenoid valve according to claim 7, wherein the support ring is axially guided in the valve housing.

9. The solenoid valve according to claim 7, wherein the receiving space has a projection provided therein which protrudes radially inward from the valve housing and which rests against the diaphragm.

10. The solenoid valve according to claim 1, wherein the entrainment geometry is formed by a collar which projects radially inward on the support ring and which is arranged so as to overlap in the radial direction with a collar which projects radially outward from the actuator.

11. The solenoid valve according to claim 1, wherein the entrainment geometry is formed by a collar projecting radially inward on the support ring or by a collar projecting outward on the actuator and which projects into a groove on the actuator or on the support ring, respectively, and is seated in the groove with an axial clearance.

12. The solenoid valve according to claim 1, wherein a media-contacted surface of the diaphragm is made to be flat.

13. The solenoid valve according to claim 1, wherein a coupling geometry is provided on the diaphragm and wherein the actuator has a retainer formed therein, in which the coupling geometry is received with a form fit.

14. The solenoid valve according to claim 1, wherein a coupling geometry is provided on the actuator, wherein the diaphragm has a retainer provided thereon, in which the coupling geometry is received with a form fit.

15. The solenoid valve according to claim 1, wherein the solenoid valve is a media-separated solenoid valve.

* * * * *